US010536696B2

(12) United States Patent
Sakomizu

(10) Patent No.: US 10,536,696 B2
(45) Date of Patent: Jan. 14, 2020

(54) IMAGE ENCODING DEVICE AND IMAGE ENCODING METHOD

(71) Applicant: Oki Electric Industry Co., Ltd., Tokyo (JP)

(72) Inventor: Kazuhito Sakomizu, Tokyo (JP)

(73) Assignee: OKI ELECTRIC INDUSTRY CO., LTD., Tokyo (JP)

(*) Notice: Subject to any disclaimer, the term of this patent is extended or adjusted under 35 U.S.C. 154(b) by 427 days.

(21) Appl. No.: 15/382,595

(22) Filed: Dec. 16, 2016

(65) Prior Publication Data

US 2017/0214915 A1    Jul. 27, 2017

(30) Foreign Application Priority Data

Jan. 22, 2016  (JP) .................................. 2016-010988

(51) Int. Cl.
| | |
|---|---|
| *H04N 19/124* | (2014.01) |
| *H04N 19/146* | (2014.01) |
| *H04N 19/176* | (2014.01) |
| *H04N 19/182* | (2014.01) |
| *G06K 9/00* | (2006.01) |

(52) U.S. Cl.
CPC ......... *H04N 19/124* (2014.11); *H04N 19/146* (2014.11); *H04N 19/176* (2014.11); *H04N 19/182* (2014.11); *G06K 9/00288* (2013.01); *G06K 9/00771* (2013.01)

(58) Field of Classification Search
USPC .................................................. 375/240.03
See application file for complete search history.

(56) References Cited

U.S. PATENT DOCUMENTS

2014/0369621 A1* 12/2014 Diggins ............... H04N 19/182
                                                            382/251

FOREIGN PATENT DOCUMENTS

| JP | 2010-193441 A |   | 9/2010 | |
|---|---|---|---|---|
| JP | 2010193441 A | * | 9/2010 | ........... H04N 19/126 |

* cited by examiner

*Primary Examiner* — William C Vaughn, Jr.
*Assistant Examiner* — Joseph Daniel A Towe
(74) *Attorney, Agent, or Firm* — Rabin & Berdo, P.C.

(57) ABSTRACT

To reduce the occurrence of an excessive encoding amount or an insufficient encoding amount and reduce the fluctuation range of the bit rate even when there is a change in the area of a region-of-interest or the properties of an image. An image encoding device according to an embodiment of the present invention includes: a block-of-interest determining unit configured to determine whether or not a block is a block-of-interest including a pixel-of-interest; a region-of-interest area-ratio calculator configured to calculate a region-of-interest area ratio based on a determination result obtained by the block-of-interest determining unit; a rate controller configured to decide a region-of-interest quantization parameter and a non-region-of-interest quantization parameter based on at least a bit rate of compression data and the region-of-interest area ratio; and a compressor configured to compress an image input in accordance with a predetermined encoding method by using the block-of-interest, the region-of-interest quantization parameter, and the non-region-of-interest quantization parameter.

16 Claims, 8 Drawing Sheets

IMAGE ENCODING DEVICE AND IMAGE ENCODING METHOD

CROSS REFERENCE TO RELATED APPLICATION(S)

This application is based upon and claims benefit of priority from Japanese Patent Application No. 2016-010988, filed on Jan. 22, 2016, the entire contents of which are incorporated herein by reference.

BACKGROUND

The present invention relates to image encoding devices and image encoding methods and is applicable to an image encoding device and an image encoding method in which image encoding is performed separately on a region-of-interest and a non-region-of-interest.

In recent years, surveillance cameras have become popular, and higher frame rates, higher resolutions, and multi-aspects are also desired. However, higher frame rates, higher resolutions, and multi-aspects cause an increase in the volume of data of moving images, thus leading to an increase in communication costs and storage costs. In order to alleviate this problem, for example, there has been proposed a method of detecting a facial region from a moving image of a person and allocating a large number of bits for compressing the facial region.

JP 2010-193441A discloses a method of allocating a large number of bits to a facial region. More specifically, the technology described in JP 2010-193441A proposes a method of allocating different numbers of bits to a region-of-interest and a non-region-of-interest in a moving image so as to decide quantization parameters QP in a system that reduces the encoding amount.

Specifically, the technology described in JP 2010-193441A involves calculating, for each facial region, the area size of the facial region and reducing the difference in qualities of the facial region and a non-facial region as the facial region becomes larger in size. This solves the problem of significant deterioration in the quality of the non-facial region, which is caused as a result of using most of the encoding amount for the facial region when the facial region is large in size.

FIG. 2 is a configuration diagram illustrating the internal configuration of a conventional image encoding system 80. In FIG. 2, the image encoding system 80 receives an input image and pixels-of-interest as input data and outputs a stream.

The image encoding system 80 has a block-of-interest determining unit 81 that outputs a block-of-interest including the input pixels-of-interest, a region-of-interest area calculator 82 that receives the block-of-interest and calculates and outputs the area of a region-of-interest, a compression ratio controller 83 that determines an offset from the area of the region-of-interest, a rate controller 84 that decides a region-of-interest QP and a non-region-of-interest QP from a target bit rate and the offset and outputs the region-of-interest QP and the non-region-of-interest QP, and a compressor 85 that compresses the input image in accordance with a compression method, such as JPEG, H.264, or H.265, based on the block-of-interest, the region-of-interest QP, and the non-region-of-interest QP and outputs a stream.

The rate controller 84 has a QP controller 811 that generates a non-region-of-interest QP from the target bit rate, and a region-of-interest QP calculator 812 that generates a region-of-interest QP from the non-region-of-interest QP and the offset.

An offset is the difference between the value of the region-of-interest QP and the value of the non-region-of-interest QP.

The rate controller 84 adds and subtracts the offset to and from the quantization parameters decide by the QP controller 811 so as to generate the region-of-interest QP and the non-region-of-interest QP.

This example corresponds to a case where the rate controller 84 outputs a value obtained by subtracting the offset from the non-region-of-interest QP decide by the QP controller 811 as the region-of-interest QP. However, there is another conceivable variation in which, for example, the rate controller 84 outputs a value obtained by adding the offset to the region-of-interest QP decide by the QP controller 811 as the non-region-of-interest QP.

Although a detailed embodiment of a QP controller is not clearly specified in particular in the technology described in JP 2010-193441A, for example, a conceivable method involves performing control based on feedback (FB) information output from the compressor 85, as illustrated in FIG. 2.

In this case, FB information is, for example, the quantization parameter used and the encoding amount at that time.

Specifically, the following two control methods are conceivable.

In the first control method, the QP controller 811 compares the encoding amount for the immediately-preceding frame with the target bit rate and increases the non-region-of-interest QP if the immediately-preceding encoding amount is larger than the encoding amount that satisfies the target bit rate or decreases the non-region-of-interest QP if the immediately-preceding encoding amount is smaller than the encoding amount that satisfies the target bit rate.

In the second control method, the QP controller 811 uses past data about the quantization parameter and the encoding amount to generate a model in which the relationship between the quantization parameter and the encoding amount has been learned. By using the model, the QP controller 811 selects a quantization parameter that may generate an encoding amount that satisfies the target bit rate.

The following method is conceivable as a method of providing different quantization parameters to a region-of-interest and a non-region-of-interest.

FIG. 3 is a configuration diagram illustrating the internal configuration of a conventional image encoding system 90.

The image encoding system 90 in FIG. 3 fixes the quantization parameter of one of the region-of-interest and the non-region-of-interest and changes the other quantization parameter so as to perform rate control.

The image encoding system 90 has a block-of-interest determining unit 91 that outputs a block-of-interest including input pixels-of-interest, a rate controller 92 that decides a region-of-interest QP and a non-region-of-interest QP from the target bit rate and the fixed QP and outputs the region-of-interest QP and the non-region-of-interest QP, and a compressor 93 that compresses the input image in accordance with a compression method, such as JPEG, H.264, or H.265, based on the block-of-interest, the region-of-interest QP, and the non-region-of-interest QP and outputs a stream.

The rate controller 92 has a QP controller 921 that generates a non-region-of-interest QP from the target bit rate and outputs the non-region-of-interest QP.

Although the region-of-interest QP is fixed in this example, a variation in which the non-region-of-interest QP is fixed is also conceivable.

Although the quality of the region-of-interest or the non-region-of-interest is not guaranteed in the image encoding system 80 illustrated in FIG. 2 since the offset is the limiting condition for the quantization parameters, significant deviation of the qualities of the region-of-interest and the non-region-of-interest do not occur. In contrast, although the quality of the region-of-interest or the non-region-of-interest is guaranteed in the image encoding system 90 illustrated in FIG. 3, significant deviation of the qualities of the region-of-interest and the non-region-of-interest may possibly occur.

Although a detailed embodiment of the QP controller 921 is not clearly specified in particular, for example, a conceivable method involves performing control based on FB information output from the compressor 93, as illustrated in FIG. 3.

Specifically, the following two control methods are conceivable.

In the first control method, in the case where the region-of-interest QP is fixed and the non-region-of-interest QP is variable, as illustrated in FIG. 3, the QP controller 921 compares the encoding amount for the immediately-preceding frame with the target bit rate and increases the non-region-of-interest QP if the immediately-preceding encoding amount is larger than the encoding amount that satisfies the target bit rate or decreases the non-region-of-interest QP if the immediately-preceding encoding amount is smaller than the encoding amount that satisfies the target bit rate.

In the second control method, the QP controller 921 uses past data about the quantization parameter and the encoding amount to generate a model in which the relationship between the quantization parameter and the encoding amount has been learned. By using the model, the QP controller 921 selects a quantization parameter that may generate an encoding amount that satisfies the target bit rate.

It is desirable to reduce an excessive encoding amount or an insufficient encoding amount since it may cause situations such as loss of data in a buffer or a transmission path of a device or an inability to effectively utilize resources.

SUMMARY

However, the following problems may occur in the conventional image encoding systems described above.

More specifically, the following problems may occur in the two QP control methods of the image encoding system 80 illustrated in FIG. 2.

In the first control method, since the encoding amount is adjusted asymptotically, it is not possible to follow rapid changes in an image or rapid changes in the area of the region-of-interest, possibly causing an excessive encoding amount or an insufficient encoding amount to occur.

In the second control method, since the model is not aware of the existence of the fixed QP region, when control is to be performed to an encoding amount or a QP deviated from learning data, a gap between prediction and actual measurement always occurs, possibly causing an excessive encoding amount or an insufficient encoding amount to occur. In addition, it is not possible to follow rapid changes in the area of the region-of-interest, possibly causing an excessive encoding amount or an insufficient encoding amount to occur.

The following problems may occur in the two QP control methods of the image encoding system 90 illustrated in FIG. 3.

In the first control method, since the encoding amount is adjusted asymptotically, it is not possible to follow rapid changes in an image or rapid changes in the area of the region-of-interest, possibly causing an excessive encoding amount or an insufficient encoding amount to occur.

In the second control method, since the model is not aware of the existence of the fixed QP region, when control is to be performed to an encoding amount or a QP deviated from learning data, a gap between prediction and actual measurement always occurs, possibly causing an excessive encoding amount or an insufficient encoding amount to occur. In addition, it is not possible to follow rapid changes in the area of the region-of-interest, possibly causing an excessive encoding amount or an insufficient encoding amount to occur.

It is desirable to reduce an excessive encoding amount or an insufficient encoding amount since it may cause situations such as loss of data in a buffer or a transmission path of a device or an inability to effectively utilize resources.

Therefore, there are demands for an image encoding device and an image encoding method that can reduce the occurrence of an excessive encoding amount or an insufficient encoding amount and that can reduce the fluctuation range of the bit rate even when there is a change in the area of a region-of-interest or the properties of an image.

To solve the problem, an image encoding device according to a first embodiment of the present invention includes: (1) a block-of-interest determining unit configured to determine whether or not a block is a block-of-interest including a pixel-of-interest; (2) a region-of-interest area-ratio calculator configured to calculate a region-of-interest area ratio based on a determination result obtained by the block-of-interest determining unit; (3) a rate controller configured to decide a region-of-interest quantization parameter and a non-region-of-interest quantization parameter based on at least a bit rate of compression data and the region-of-interest area ratio; and (4) a compressor configured to compress an image input in accordance with a predetermined encoding method by using the block-of-interest, the region-of-interest quantization parameter, and the non-region-of-interest quantization parameter.

An image encoding method according to a second embodiment of the present invention includes: (1) causing a block-of-interest determining unit to determine whether or not a block is a block-of-interest including a pixel-of-interest; (2) causing a region-of-interest area-ratio calculator to calculate a region-of-interest area ratio based on a determination result obtained by the block-of-interest determining unit; (3) causing a rate controller to decide a region-of-interest quantization parameter and a non-region-of-interest quantization parameter based on at least a bit rate of compression data and the region-of-interest area ratio; and (4) causing a compressor to compress an image input in accordance with a predetermined encoding method by using the block-of-interest, the region-of-interest quantization parameter, and the non-region-of-interest quantization parameter.

An image encoding program according to a third embodiment of the present invention causes a computer to function as: (1) a block-of-interest determining unit configured to determine whether or not a block is a block-of-interest including a pixel-of-interest; (2) a region-of-interest area-ratio calculator configured to calculate a region-of-interest area ratio based on a determination result obtained by the block-of-interest determining unit; (3) a rate controller configured to decide a region-of-interest quantization parameter and a non-region-of-interest quantization parameter based on at least a bit rate of compression data and the region-of-interest area ratio; and (4) a compressor configured to compress an image input in accordance with a predetermined encoding method by using the block-of-interest, the region-of-interest quantization parameter, and the non-region-of-interest quantization parameter.

According to the embodiments of the present invention, the problem that an excessive encoding amount or an insufficient encoding amount may occur can be alleviated, and the fluctuation range of the bit rate can be reduced even when there is a change in the area of a region-of-interest or the properties of an image.

DETAILED DESCRIPTION OF THE EMBODIMENT(S)

Figure 1:
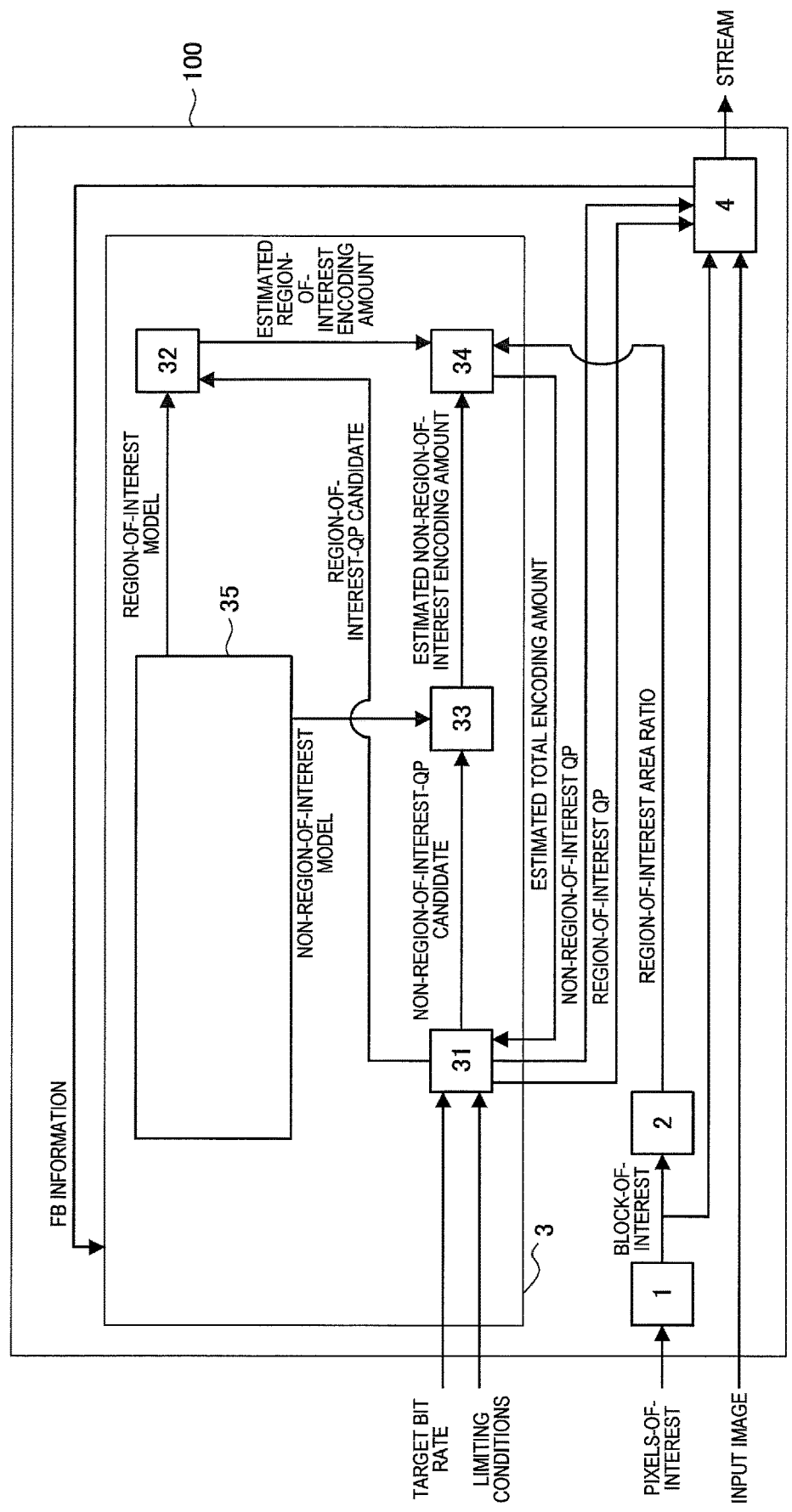
FIG. 1 is a configuration diagram illustrating the internal configuration of an image encoding device according to a first embodiment.
Figure 2:
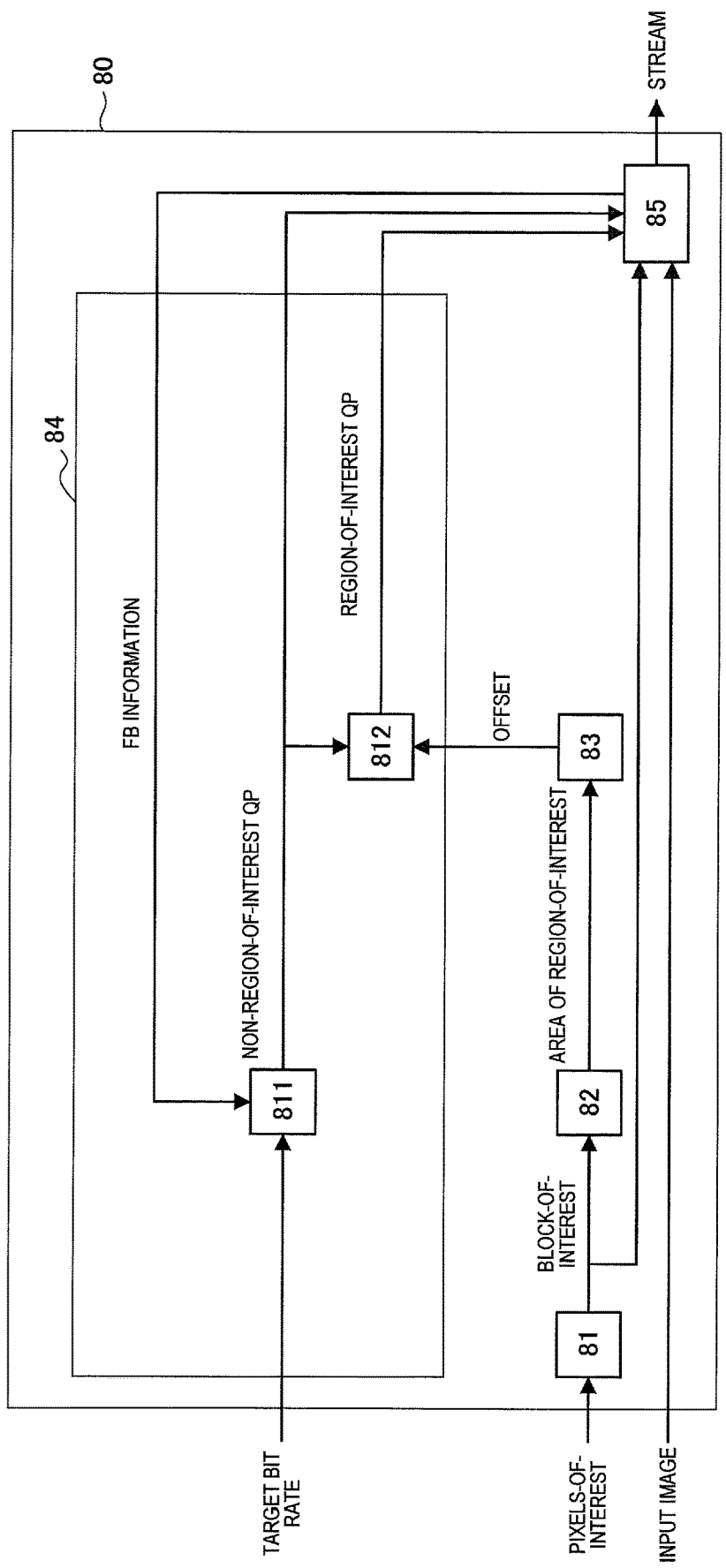
FIG. 2 is a configuration diagram illustrating the internal configuration of a conventional image encoding system.
Figure 3:
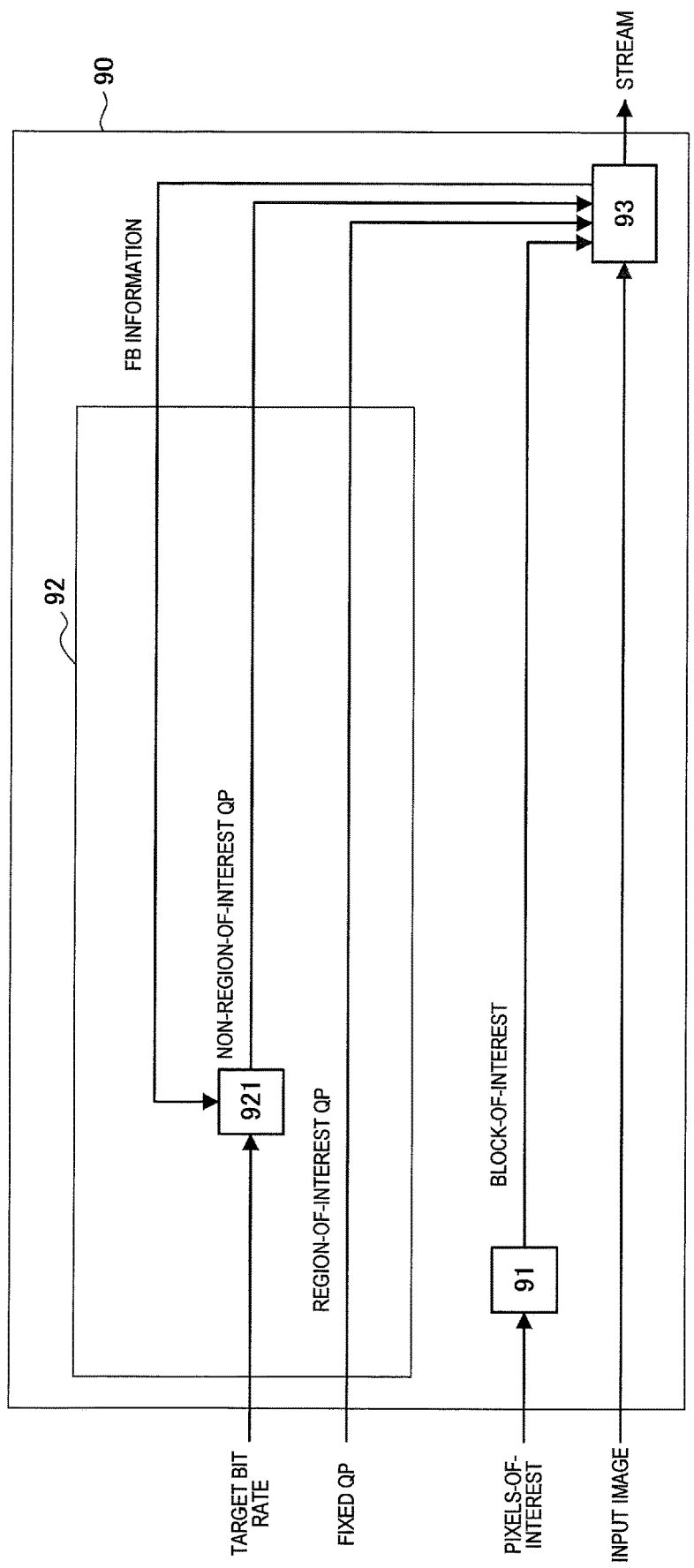
FIG. 3 is a configuration diagram illustrating the internal configuration of a conventional image encoding system.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

An image encoding device, an image encoding method, and an image encoding program according to a first embodiment of the present invention will be described in detail below with reference to the drawings.
(A-1) Configuration of First Embodiment
FIG. 1 is a configuration diagram illustrating the internal configuration of an image encoding device according to a first embodiment.

Although the hardware configuration of an image encoding device 100 is not illustrated, for example, an arithmetic processor having, for example, a CPU, a ROM, a RAM, EEPROM, and an input-output interface can be applied, and the hardware configuration can be realized by the CPU executing a processing program (image encoding program) stored in the ROM. An image encoding system may be established by installing a processing program (image encoding program) into a device. Even in that case, the image encoding program can be expressed with the processing blocks illustrated in FIG. 1.

In FIG. 1, the image encoding device 100 according to the first embodiment has a block-of-interest determining unit 1, a region-of-interest area-ratio calculator 2, a rate controller 3, and a compressor 4.

The rate controller 3 has a QP controller 31, a region-of-interest encoding-amount calculator 32, a non-region-of-interest encoding-amount calculator 33, a total-encoding-amount estimator 34, and a model provider 35.

The image encoding device 100 receives an image signal, compresses input image data in accordance with a compression method, such as JPEG, H.264, or H.265, and outputs the compressed image as stream data. Although not illustrated in FIG. 1, the image encoding device 100 is connected to, for example, an image memory that accumulates image data, and data related to a single-frame image accumulated in, for example, the image memory is input to the image encoding device 100.

The block-of-interest determining unit 1 receives pixels-of-interest and determines a block (referred to as "block-of-interest" hereinafter) that includes the input pixels-of-interest. The block-of-interest determining unit 1 sends the block-of-interest obtained as a result of the determination to the region-of-interest area-ratio calculator 2 and the compressor 4. For example, the block-of-interest determining unit 1 divides the single-frame image into unit blocks and determines a unit block that includes the pixels-of-interest as a block-of-interest.

The region-of-interest area-ratio calculator 2 receives the block-of-interest determined by the block-of-interest determining unit 1 and calculates the area percentage of the block-of-interest in the entire image as a region-of-interest area ratio. Moreover, the region-of-interest area-ratio calculator 2 sends the calculated region-of-interest area ratio to the rate controller 3.

The rate controller 3 receives a target bit rate, limiting conditions, and the region-of-interest area ratio, decides a quantization parameter (QP) of a region-of-interest (referred to as "region-of-interest QP" hereinafter) and a quantization parameter (QP) of a non-region-of-interest (referred to as "non-region-of-interest QP" hereinafter) based on the target bit rate, the limiting conditions, and the region-of-interest area ratio, and sends the region-of-interest QP and the non-region-of-interest QP to the compressor 4.

The limiting conditions include, for example, an offset and a fixed quantization parameter.

Assuming that the encoding amount of the entire image that satisfies the target bit rate is defined as R, the region-of-interest QP is defined as Qr, the non-region-of-interest QP is defined as Qe, a region-of-interest model expressing the encoding amount in a case where the entire image is encoded as a region-of-interest is defined as $Mr(Qr)$, a non-region-of-interest model expressing the encoding amount in a case where the entire image is encoded as a non-region-of-interest is defined as $Me(Qe)$, and the region-of-interest area ratio is defined as $\alpha$, the rate controller 3 controls the rate by calculating the region-of-interest QP and the non-region-of-interest QP that satisfy expression (1) and the limiting conditions.

$$R = \alpha \times Mr(Qr) + (1-\alpha) \times Me(Qe) \tag{1}$$

The model provider 35 provides a region-of-interest model and a non-region-of-interest model. Specifically, the model provider 35 outputs a region-of-interest model to the region-of-interest encoding-amount calculator 32 and outputs a non-region-of-interest model to the non-region-of-interest encoding-amount calculator 33.

The model provider 35 generates, for example, a region-of-interest model and a non-region-of-interest model based on feedback (FB) information output from the compressor 4, which will be described later.

The FB information contains, for example, the quantization parameters (i.e., the region-of-interest QP and the non-region-of-interest QP) that have been used, the encoding amounts (i.e., the region-of-interest encoding amount and the non-region-of-interest encoding amount) at that time, and the region-of-interest area ratio.

Specifically, based on the FB information from the compressor 4, the model provider 35 uses past data about the quantization parameters and the encoding amounts to learn the relationship between the quantization parameters and the encoding amounts and generates a region-of-interest model and a non-region-of-interest model. With regard to the method of learning the region-of-interest model and the non-region-of-interest model, for example, a fitting process using the least-square method can be performed.

Although various kinds of methods are provided with regard to the relationship model between the quantization parameters and the encoding amounts, information other than the quantization parameters, the encoding amounts, or the region-of-interest area ratio may be received in accordance with the model used.

Furthermore, although the region-of-interest model and the non-region-of-interest model are separate from each other in the present embodiment, the model provider 35 may provide a single model shared between the region-of-interest model and the non-region-of-interest model.

A method used by the model provider 35 for acquiring the FB information as learning data can involve preliminarily providing a period in which the entire screen is encoded with a uniform quantization parameter QP and generating a region-of-interest model and a non-region-of-interest model based on the FB information at the time of the encoding process.

The QP controller 31 receives the target bit rate and the limiting conditions. Furthermore, the QP controller 31 also receives an estimated total encoding amount from the total-encoding-amount estimator 34. The QP controller 31 compares the target bit rate with the estimated total encoding amount and generates a region-of-interest-QP candidate and a non-region-of-interest-QP candidate that satisfy the limiting conditions until the estimated total encoding amount satisfies the target bit rate. Then, if a region-of-interest-QP candidate and a non-region-of-interest-QP candidate with which the estimated total encoding amount satisfies the target bit rate are found, the QP controller 31 outputs the region-of-interest-QP candidate and the non-region-of-interest-QP candidate as the region-of-interest QP and the non-region-of-interest QP. Moreover, the QP controller 31 sends the region-of-interest-QP candidate to the region-of-interest encoding-amount calculator 32 and sends the non-region-of-interest-QP candidate to the non-region-of-interest encoding-amount calculator 33.

Based on the region-of-interest-QP candidate from the QP controller 31 and the region-of-interest model from the model provider 35, the region-of-interest encoding-amount calculator 32 calculates an estimated region-of-interest encoding amount and sends the estimated region-of-interest encoding amount to the total-encoding-amount estimator 34. For example, the region-of-interest encoding-amount calculator 32 applies the region-of-interest-QP candidate to the region-of-interest model expressing the encoding amount in a case where the entire image is encoded as a region-of-interest, thereby generating the estimated region-of-interest encoding amount.

Based on the non-region-of-interest-QP candidate from the QP controller 31 and the non-region-of-interest model from the model provider 35, the non-region-of-interest encoding-amount calculator 33 calculates an estimated non-region-of-interest encoding amount and sends the estimated non-region-of-interest encoding amount to the total-encoding-amount estimator 34. For example, the non-region-of-interest encoding-amount calculator 33 applies the non-region-of-interest-QP candidate to the non-region-of-interest model expressing the encoding amount in a case where the entire image is encoded as a non-region-of-interest, thereby generating the estimated non-region-of-interest encoding amount.

The total-encoding-amount estimator 34 calculates an estimated total encoding amount based on the region-of-interest area ratio from the region-of-interest area-ratio calculator 2, the estimated region-of-interest encoding amount from the region-of-interest encoding-amount calculator 32, and the estimated non-region-of-interest encoding amount from the non-region-of-interest encoding-amount calculator 33, and sends the calculated estimated total encoding amount to the QP controller 31.

For example, the total-encoding-amount estimator 34 multiplies the estimated region-of-interest encoding amount by the value of the region-of-interest area ratio and multiples the estimated non-region-of-interest encoding amount by a "value obtained by subtracting the region-of-interest area ratio from 1", thereby generating the estimated total encoding amount.

Based on the block-of-interest, the region-of-interest QP, and the non-region-of-interest QP, the compressor 4 compresses the received input image in accordance with a compression method, such as JPEG, H.264, or H.265, and outputs a stream.

(A-2) Operation of First Embodiment

Next, the operation of the image encoding method in the image encoding device 100 according to the first embodiment will be described in detail with reference to the drawings.

Figure 4:
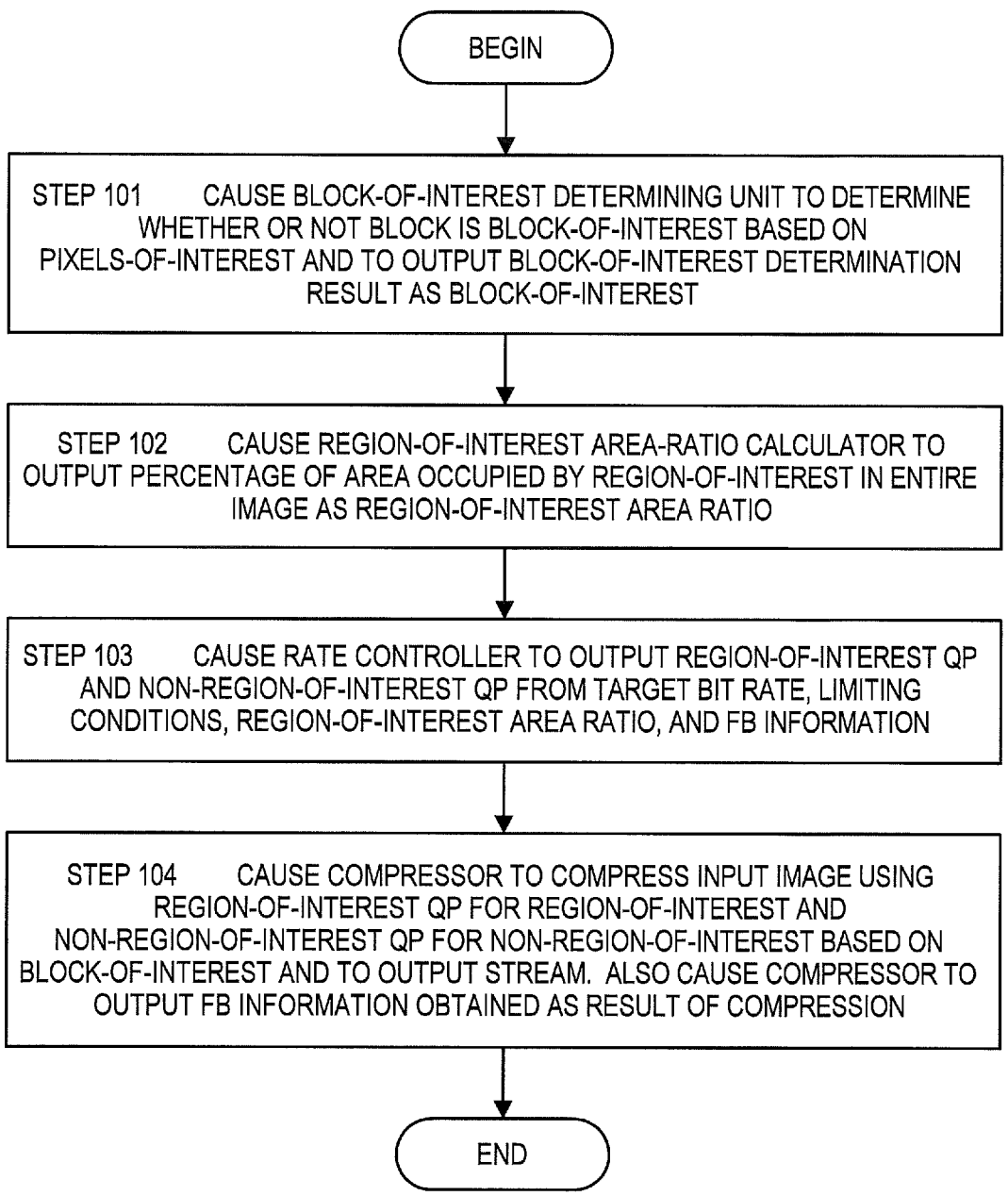
FIG. 4 is a flowchart illustrating the operation of an image encoding method according to the first embodiment.

FIG. 4 is a flowchart illustrating the operation of the image encoding method according to the first embodiment.

In STEP 101, the block-of-interest determining unit 1 determines whether or not a block is a block-of-interest based on input pixels-of-interest and outputs the block-of-interest determination result as a block-of-interest.

Figure 5:
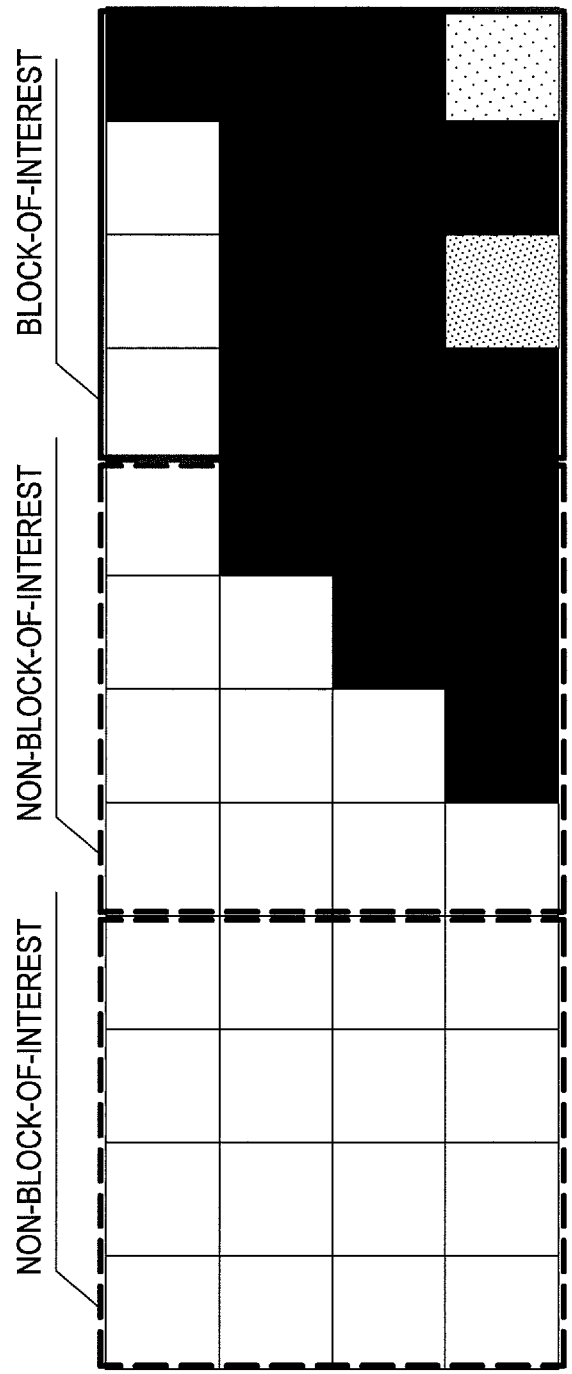
FIG. 5 is an explanatory diagram for describing a method of determining a block-of-interest in accordance with the first embodiment.

FIG. 5 is an explanatory diagram for describing a method of determining a block-of-interest in accordance with the first embodiment. In FIG. 5, a hatched region indicates a region-of-interest.

With regard to the method of determining a block-of-interest, various kinds of methods can be widely applied. For example, if there is even a single pixel-of-interest included in a conversion block, it may be determined that the conversion block is a block-of-interest. Furthermore, for example, if more than or equal to half of pixels within a conversion block are included in a region-of-interest, it may be determined that the conversion block is a block-of-interest. Moreover, for example, if all pixels within a conversion block are included in a region-of-interest, it may be determined that the conversion block is a block-of-interest. In either case, the method of determining a block-of-interest involves determining that a block is a block-of-interest if all of or one or more of pixels within the block are included in a region-of-interest.

FIG. 5 illustrates that it is determined that a conversion block is a block-of-interest, for example, when more than or equal to half of pixels within the conversion block, which is constituted of 16 pixels, namely, four pixels in the vertical direction by four pixels in the horizontal direction, are a region-of-interest.

In STEP 102, the region-of-interest area-ratio calculator 2 outputs the percentage of the area occupied by the region-of-interest in the entire image as the region-of-interest area ratio.

In STEP 103, the rate controller 3 calculates a region-of-interest QP and a non-region-of-interest QP based on the target bit rate, the limiting conditions, the region-of-interest area ratio, and the FB information, and outputs the region-of-interest QP and the non-region-of-interest QP.

In STEP 104, the compressor 4 compresses the input image using the region-of-interest QP for the region-of-interest and the non-region-of-interest QP for the non-region-of-interest based on the block-of-interest and outputs a stream. Moreover, the compressor 4 outputs the FB information obtained as a result of the compressing process to the model provider 35 of the rate controller 3.

Figure 6:
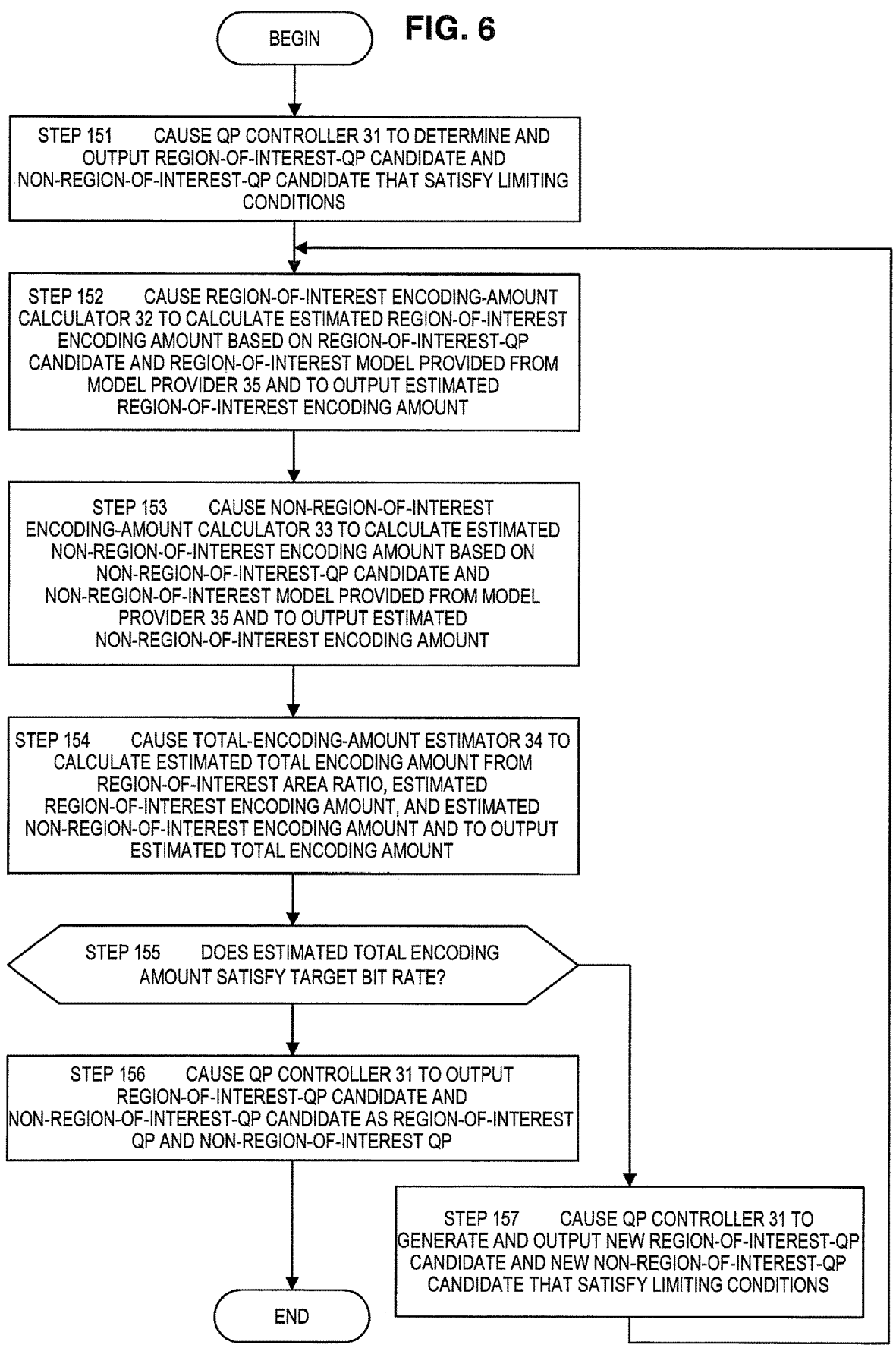
FIG. 6 is a flowchart illustrating the operation of a process performed by a rate controller according to the first embodiment for generating a region-of-interest QP and a non-region-of-interest QP.

FIG. 6 is a flowchart illustrating the operation of a process performed by the rate controller 3 according to the first embodiment for generating the region-of-interest QP and the non-region-of-interest QP. The process operation in STEP 103 will be described in detail with reference to FIG. 6.

In STEP 151, the QP controller 31 determines and outputs a region-of-interest-QP candidate and a non-region-of-interest-QP candidate that satisfy the limiting conditions.

In STEP 152, the region-of-interest encoding-amount calculator 32 calculates an estimated region-of-interest encoding amount based on the region-of-interest-QP candidate and a region-of-interest model provided from the model provider 35 and outputs the estimated region-of-interest encoding amount.

In STEP 153, the non-region-of-interest encoding-amount calculator 33 calculates an estimated non-region-of-interest encoding amount based on the non-region-of-interest-QP candidate and a non-region-of-interest model provided from the model provider 35 and outputs the estimated non-region-of-interest encoding amount.

In STEP 154, the total-encoding-amount estimator 34 calculates an estimated total encoding amount from the region-of-interest area ratio, the estimated region-of-interest encoding amount, and the estimated non-region-of-interest encoding amount and outputs the estimated total encoding amount.

In STEP 155, the QP controller 31 determines whether the estimated total encoding amount satisfies the target bit rate.

If the estimated total encoding amount satisfies the target bit rate, the process proceeds to STEP 156.

If the estimated total encoding amount does not satisfy the target bit rate, the process proceeds to STEP 157.

As a method of determining whether or not the estimated total encoding amount satisfies the target bit rate, the following method can be used. For example, assuming that the target bit rate is defined as T [bps] and a moving image of 30 fps is compressed, if the estimated total encoding amount satisfies T/30±α [bit] assuming that α is a preset value, it is determined that the estimated total encoding amount satisfies the target bit rate.

Although there have been proposed many methods for deciding an encoding amount that satisfies the target bit rate, the embodiments of the present invention are not dependent on various kinds of methods. Detailed descriptions thereof will thus be omitted here.

In STEP 156, if the estimated total encoding amount satisfies the target bit rate, the QP controller 31 outputs the region-of-interest-QP candidate and the non-region-of-interest-QP candidate as the region-of-interest QP and the non-region-of-interest QP and ends this process.

In STEP 157, if the estimated total encoding amount does not satisfy the target bit rate, the QP controller 31 generates and outputs a new region-of-interest-QP candidate and a new non-region-of-interest-QP candidate that satisfy the limiting conditions. Subsequently, the process returns to STEP 152.

A method that can be used for generating a new region-of-interest-QP candidate and a new non-region-of-interest-QP candidate involves, for example, decreasing the values of the quantization parameters QP if the estimated total encoding amount is larger than the encoding amount that satisfies the target bit rate or increasing the values of the quantization parameters QP if the estimated total encoding amount is smaller than the encoding amount that satisfies the target bit rate.

(A-3) Advantageous Effects of First Embodiment

As described above, according to the first embodiment, the quantization parameters are controlled by using not only the target bit rate, but also the region-of-interest area ratio, so that the problem that an excessive encoding amount or an insufficient encoding amount may occur can be alleviated, and the fluctuation range of the bit rate can be reduced even when there is a change in the area of the region-of-interest or the properties of the image.

(B) Second Embodiment

Next, an image encoding device, an image encoding method, and an image encoding program according to a second embodiment of the present invention will be described in detail below with reference to the drawings.

(B-1) Configuration of Second Embodiment

Figure 7:
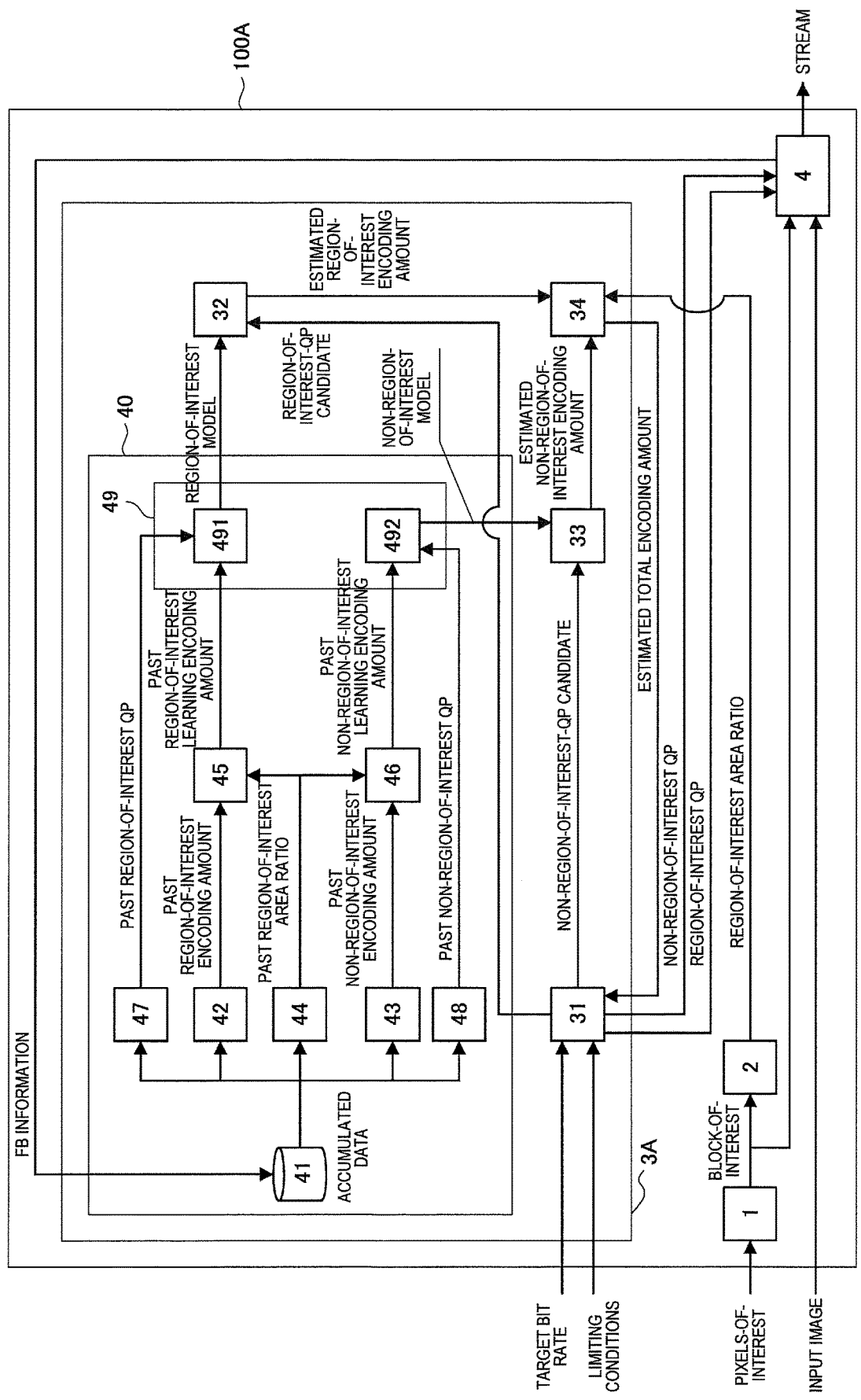
FIG. 7 is a configuration diagram illustrating the internal configuration of an image encoding device according to a second embodiment.

FIG. 7 is a configuration diagram illustrating the internal configuration of an image encoding device according to a second embodiment.

In FIG. 7, an image encoding device 100A according to the second embodiment has a block-of-interest determining unit 1, a region-of-interest area-ratio calculator 2, a rate controller 3A, and a compressor 4.

The rate controller 3A has a QP controller 31, a region-of-interest encoding-amount calculator 32, a non-region-of-interest encoding-amount calculator 33, a total-encoding-amount estimator 34, and a model provider 40.

Furthermore, the model provider 40 has a recording unit 41, a region-of-interest encoding-amount extracting unit 42, a non-region-of-interest encoding-amount extracting unit 43, a region-of-interest area-ratio extracting unit 44, a region-of-interest learning-encoding-amount generating unit 45, a non-region-of-interest learning-encoding-amount generating unit 46, a region-of-interest-QP extracting unit 47, a non-region-of-interest-QP extracting unit 48, and a model learning unit 49. The model learning unit 49 has a region-of-interest-model learning unit 491 and a non-region-of-interest-model learning unit 492.

The block-of-interest determining unit 1, the region-of-interest area-ratio calculator 2, the compressor 4, the QP controller 31, the region-of-interest encoding-amount calculator 32, the non-region-of-interest encoding-amount calculator 33, and the total-encoding-amount estimator 34 may be those described and used in the first embodiment.

Therefore, in the second embodiment, the configuration of the model provider 40, which is different from that in the first embodiment and is characteristic of the second embodiment, will be mainly described.

The model provider 40 accumulates FB information obtained as a result of a compressing process from the compressor 4, generates a region-of-interest model and a non-region-of-interest model by extracting a past region-of-interest encoding amount and a past non-region-of-interest encoding amount from the accumulated data, and outputs the region-of-interest model and the non-region-of-interest model.

The recording unit 41 accumulates the FB information from the compressor 4. The recording unit 41 outputs the accumulated FB information as accumulated data.

The region-of-interest encoding-amount extracting unit 42 extracts a past region-of-interest encoding amount from the accumulated data in the recording unit 41 and sends the past region-of-interest encoding amount to the region-of-interest learning-encoding-amount generating unit 45.

The non-region-of-interest encoding-amount extracting unit 43 extracts a past non-region-of-interest encoding amount from the accumulated data in the recording unit 41 and sends the past non-region-of-interest encoding amount to the non-region-of-interest learning-encoding-amount generating unit 46.

The region-of-interest area-ratio extracting unit 44 extracts a past region-of-interest area ratio from the accumulated data in the recording unit 41 and sends the past region-of-interest area ratio to the region-of-interest encoding-amount extracting unit 42 and the non-region-of-interest encoding-amount extracting unit 43.

The region-of-interest learning-encoding-amount generating unit 45 calculates a past region-of-interest learning encoding amount based on the past region-of-interest encoding amount and the past region-of-interest area ratio. Furthermore, the region-of-interest learning-encoding-amount generating unit 45 sends the past region-of-interest learning encoding amount to the region-of-interest-model learning unit 491 of the model learning unit 49.

The non-region-of-interest learning-encoding-amount generating unit 46 sends a past non-region-of-interest learning encoding amount to the non-region-of-interest-model learning unit 492 of the model learning unit 49 based on the past non-region-of-interest encoding amount and the past region-of-interest area ratio.

The region-of-interest-QP extracting unit 47 extracts a past region-of-interest QP from the accumulated data in the recording unit 41 and sends the past region-of-interest QP to the region-of-interest-model learning unit 491 of the model learning unit 49.

The non-region-of-interest-QP extracting unit 48 extracts a past non-region-of-interest QP from the accumulated data in the recording unit 41 and sends the past non-region-of-interest QP to the non-region-of-interest-model learning unit 492 of the model learning unit 49.

The model learning unit 49 is constituted of a model learning unit E that generates a region-of-interest model and a non-region-of-interest model from the past non-region-of-interest learning encoding amount and the past non-region-of-interest QP based on the past region-of-interest learning encoding amount and the past region-of-interest QP and that outputs the region-of-interest model and the non-region-of-interest model.

The model learning unit 49 learns the region-of-interest model and the non-region-of-interest model based on the past region-of-interest learning encoding amount and the past region-of-interest QP, and the past non-region-of-interest learning encoding amount and the past non-region-of-interest QP, respectively, and outputs the region-of-interest model and the non-region-of-interest model.

The present embodiment corresponds to a case where the model learning unit 49 includes the region-of-interest-model learning unit 491 that learns the region-of-interest model based on the past region-of-interest QP and the past region-of-interest learning encoding amount and the non-region-of-interest-model learning unit 492 that learns the non-region-of-interest model based on the past non-region-of-interest QP and the past non-region-of-interest learning encoding amount.

The model learning unit 49 can employ various kinds of methods so long as the various kinds of methods allow the model learning unit 49 to learn and generate a region-of-interest model and a non-region-of-interest model based on the past quantization parameters and the past encoding amounts.

For example, the model learning unit 49 may treat a past region-of-interest learning encoding amount and a past region-of-interest QP as one set of data, treat a past non-region-of-interest learning encoding amount and a past non-region-of-interest QP as another set of data, use these two sets of data as separate equal data for learning a single common model, and output the common model as a region-of-interest model and a non-region-of-interest model.

Since there is a large number of data (i.e., a large number of blocks) that support the learning process in the method of generating a region-of-interest and a non-region-of-interest by utilizing learning of the single common model, this method is more advantageous than in the case of the configuration illustrated in FIG. 7 in that a sufficient learning process can be performed. In contrast, in the case of the configuration illustrated in FIG. 7, the number of data (i.e., the number of blocks) that supports the learning process is smaller than in the former case. Therefore, even though the configuration illustrated in FIG. 7 is inferior to the case of utilizing learning of the common model in terms of stability of the learning process, the configuration illustrated in FIG. 7 is advantageous in that the learning process is specialized individually on the region-of-interest and the non-region-of-interest.

For example, in a case where a facial region is set as a region-of-interest, there is a sufficiently high possibility that the properties of a moving image of the facial region and the properties of a moving image of a non-facial region differ from each other, and there is a certain advantage in generating models specialized on respective regions.

The region-of-interest learning-encoding-amount generating unit 45 generates a past region-of-interest learning encoding amount by, for example, dividing a past region-of-interest encoding amount by the value of a past region-of-interest area ratio.

The non-region-of-interest learning-encoding-amount generating unit 46 generates a past non-region-of-interest learning encoding amount by, for example, dividing a past non-region-of-interest encoding amount by a "value obtained by subtracting the region-of-interest area ratio from 1".

Although the region-of-interest area ratio is input to the recording unit 41 via the FB information from the compressor 4 in the second embodiment, the region-of-interest area ratio may be directly input to the recording unit 41 from the region-of-interest area-ratio calculator 2.

(B-2) Operation of Second Embodiment

Next, the operation of the image encoding process in the image encoding device 100A according to the second embodiment will be described in detail with reference to the drawings.

Because the image encoding device 100A basically performs the same process as the process illustrated in FIGS. 4 and 6 in the first embodiment, a process operation performed by the model provider 40 of the rate controller 3A will be described in detail below.

Figure 8:
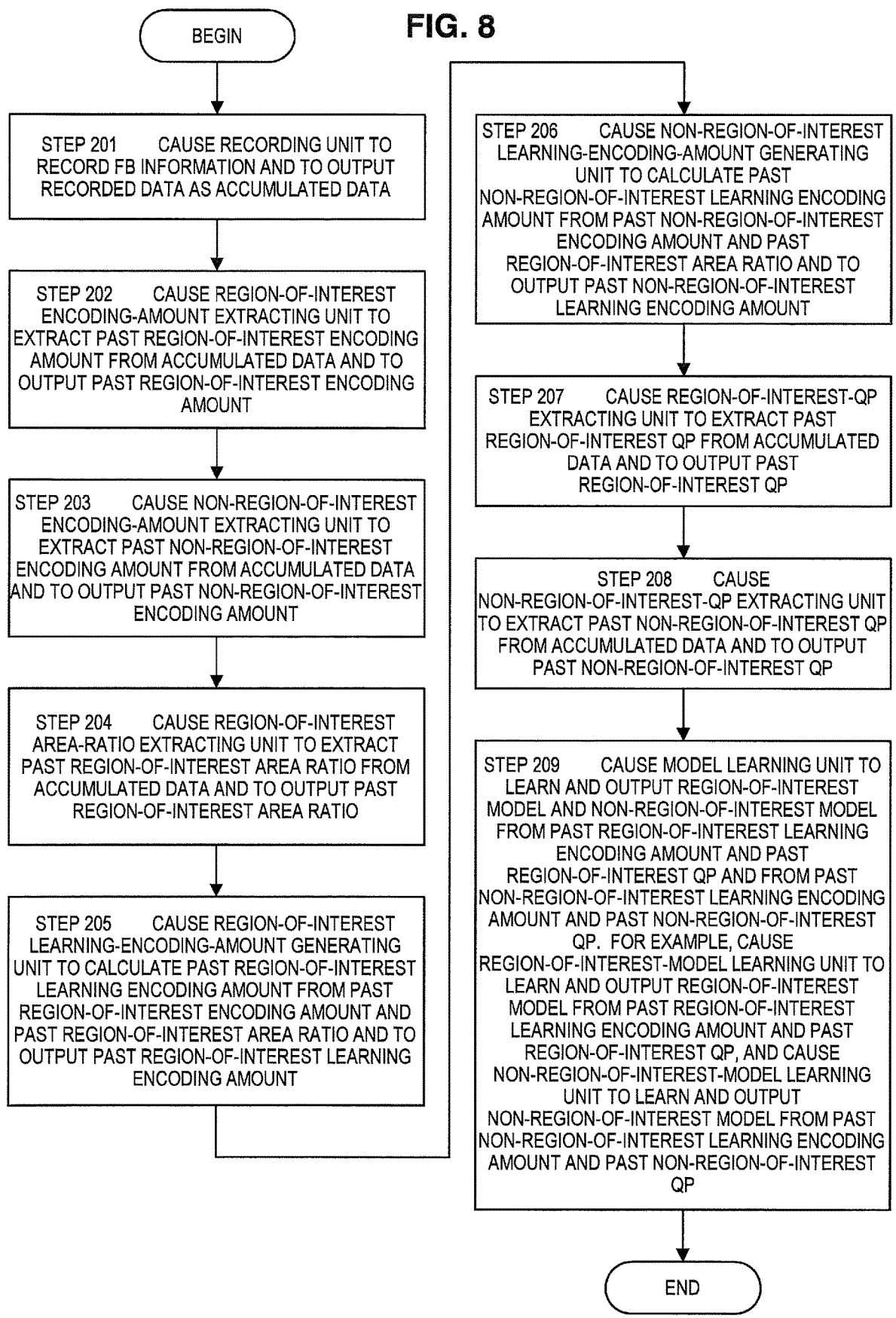
FIG. 8 is a flowchart illustrating the operation of a process performed in a model provider of a rate controller according to the second embodiment.

FIG. 8 is a flowchart illustrating the operation of the process performed in the model provider 40 of the rate controller 3A according to the second embodiment.

In STEP 201, FB information is recorded in the recording unit 41, and the data recorded in the recording unit 41 is output as accumulated data.

In STEP 202, the region-of-interest encoding-amount extracting unit 42 extracts a past region-of-interest encoding amount from the accumulated data and outputs the past region-of-interest encoding amount.

In STEP 203, the non-region-of-interest encoding-amount extracting unit 43 extracts a past non-region-of-interest encoding amount from the accumulated data and outputs the past non-region-of-interest encoding amount.

In STEP 204, the region-of-interest area-ratio extracting unit 44 extracts a past region-of-interest area ratio from the accumulated data and outputs the past region-of-interest area ratio.

In STEP 205, the region-of-interest learning-encoding-amount generating unit 45 calculates a past region-of-interest learning encoding amount based on the past region-of-interest encoding amount and the past region-of-interest area ratio and outputs the past region-of-interest learning encoding amount.

In STEP 206, the non-region-of-interest learning-encoding-amount generating unit 46 calculates a past non-region-of-interest learning encoding amount based on the past non-region-of-interest encoding amount and the past region-of-interest area ratio and outputs the past non-region-of-interest learning encoding amount.

In STEP 207, the region-of-interest-QP extracting unit 47 extracts a past region-of-interest QP from the accumulated data and outputs the past region-of-interest QP.

In STEP 208, the non-region-of-interest-QP extracting unit 48 extracts a past non-region-of-interest QP from the accumulated data and outputs the past non-region-of-interest QP.

In STEP 209, the model learning unit 49 learns a region-of-interest model and a non-region-of-interest model from the past region-of-interest learning encoding amount and the past region-of-interest QP, and the past non-region-of-interest learning encoding amount and the past non-region-of-interest QP, respectively, and outputs the region-of-interest model and the non-region-of-interest model.

For example, as illustrated in FIG. 7, the region-of-interest-model learning unit 491 learns the region-of-interest model from the past region-of-interest learning encoding amount and the past region-of-interest QP and outputs the region-of-interest model, and the non-region-of-interest-model learning unit 492 learns the non-region-of-interest model from the past non-region-of-interest learning encoding amount and the past non-region-of-interest QP and outputs the non-region-of-interest model.

(B-3) Advantageous Effects of Second Embodiment

As described above, according to the second embodiment, data is processed in accordance with the model in the total-encoding-amount estimator, so that an effective learning process is possible even if the learning process is performed at all times together with the compressing process.

Accordingly, the accuracy of rate control can be maintained even if the properties of the image change over time.

(C) Other Embodiments

The advantageous effects of the embodiments of the present invention can be attained by using an encoding amount necessary for transmitting a residual component as an encoding amount contained in the FB information in the first and second embodiments described above.

Although the configuration described above in each of the first and second embodiments receives a region-of-interest, the advantageous effects of the embodiments of the present invention can also be attained with a configuration that receives a non-region-of-interest.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An image encoding device comprising:
    a processor;
    a non-transitory storage medium containing program instructions scored thereon, execution of which by the processor causes the image encoding device to provide functions of:
        a block-of-interest determining unit configured to determine whether or not a block is a block-of-interest including a pixel-of-interest;
        a region-of-interest area-ratio calculator configured to calculate a region-of-interest area ratio based on a determination result obtained by the block-of-interest determining unit;
        a model provider configured to output a region-of-interest model that expresses an encoding amount in a case where an entire image is encoded as a region-of-interest, and a non-region-of-interest model that expresses the encoding amount in a case where the entire image is encoded as a non-region-of-interest;
        a rate controller configured to decide a region-of-interest quantization parameter and a non-region-of-interest quantization parameter based on a bit rate of compression data and the region-of-interest area ratio, the bit rate of compression data being calculated by multiplying the region-of-interest area ratio and the region-of-interest model, and multiplying the non-region-of-interest area ratio and the non-region-of-interest model; and
        a compressor configured to compress an image input in accordance with a predetermined encoding method by using the block-of-interest, the region-of-interest quantization parameter, and the non-region-of-interest quantization parameter.

2. The image encoding device according to claim 1, wherein the rate controller decides the region-of-interest quantization parameter and the non-region-of-interest quantization parameter based on the bit rate, a predetermined limiting condition, and the region-of-interest area ratio.

3. The image encoding device according to claim 2, wherein the rate controller includes
a quantization-parameter controller configured to compare the bit rate and an estimated total encoding amount, generate a region-of-interest quantization-parameter candidate and a non-region-of-interest quantization-parameter candidate that satisfy the limiting condition until the estimated total encoding amount satisfies the bit rate, and set, when the quantization-parameter controller detects a region-of-interest quantization-parameter candidate and a non-region-of-interest quantization-parameter candidate with which the estimated total encoding amount satisfies the bit rate, the region-of-interest quantization-parameter candidate and the non-region-of-interest quantization-parameter candidate as the region-of-interest quantization parameter and the non-region-of-interest quantization parameter, respectively.

4. The image encoding device according to claim 3, wherein the rate controller includes
a region-of-interest encoding-amount calculator configured to calculate an estimated region-of-interest encoding amount based on the region-of-interest quantization-parameter candidate and the region-of-interest model,
a non-region-of-interest encoding-amount calculator configured to calculate an estimated non-region-of-interest encoding amount based on the non-region-of-interest quantization-parameter candidate and the non-region-of-interest model, and
a total-encoding-amount estimator configured to calculate the estimated total encoding amount based on the region-of-interest area ratio, the estimated region-of-interest encoding amount, and the estimated non-region-of-interest encoding amount.

5. The image encoding device according to claim 4, wherein the region-of-interest encoding-amount calculator generates the estimated region-of-interest encoding amount by applying the region-of-interest quantization-parameter candidate to the region-of-interest model, and
the non-region-of-interest encoding-amount calculator generates the estimated non-region-of-interest encoding amount by applying the non-region-of-interest quantization-parameter candidate to the non-region-of-interest model.

6. The image encoding device according to claim 4, wherein the total-encoding-amount estimator multiplies the estimated region-of-interest encoding amount by the region-of-interest area ratio and multiplies the estimated non-region-of-interest encoding amount by a value obtained by subtracting the region-of-interest area ratio from 1, so as to generate the estimated total encoding amount.

7. The image encoding device according to claim 3, wherein the model provider generates the region-of-interest model and the non-region-of-interest model based on predetermined feedback information obtained as a result of an encoding process performed by the compressor.

8. The image encoding device according to claim 3, wherein the model provider preliminarily provides a period in which an entire screen is encoded with a uniform quantization parameter and generates the region-of-interest model and the non-region-of-interest model based on feedback information obtained as a result of an encoding process.

9. The image encoding device according to claim 3, wherein the model provider generates the region-of-interest model and the non-region-of-interest model in accordance with a common model.

10. The image encoding device according to claim 7, wherein the model provider includes
a recording unit configured to accumulate the feedback information,
a region-of-interest encoding-amount extracting unit configured to extract a past region-of-interest encoding amount from the information accumulated in the recording unit,
a non-region-of-interest encoding-amount extracting unit configured to extract a past non-region-of-interest encoding amount from the information accumulated in the recording unit,
a region-of-interest area-ratio extracting unit configured to extract a past region-of-interest area ratio from the information accumulated in the recording unit,
a region-of-interest learning-encoding-amount generating unit configured to calculate a past region-of-interest learning encoding amount based on the past region-of-interest encoding amount and the past region-of-interest area ratio,
a non-region-of-interest learning-encoding-amount generating unit configured to calculate a past non-region-of-interest learning encoding amount based on the past non-region-of-interest encoding amount and the past region-of-interest area ratio,
a region-of-interest quantization-parameter extracting unit configured to extract a past region-of-interest quantization parameter from the information accumulated in the recording unit,
a non-region-of-interest quantization-parameter extracting unit configured to extract a past non-region-of-interest quantization parameter from the information accumulated in the recording unit, and
a model learning unit configured to generate the region-of-interest model and the non-region-of-interest model based on the past region-of-interest learning encoding amount, the past region-of-interest quantization parameter, the past non-region-of-interest learning encoding amount, and the past non-region-of-interest quantization parameter.

11. The image encoding device according to claim 10, wherein the model learning unit treats the past region-of-interest learning encoding amount and the past region-of-interest quantization parameter as one set of first data, treats the past non-region-of-interest learning encoding amount and the past non-region-of-interest quantization parameter as one set of second data, uses the two sets of first data and second data as separate equal data for learning a common model, and outputs the common model as the region-of-interest model and the non-region-of-interest model.

12. The image encoding device according to claim 10, wherein the model learning unit includes
a region-of-interest-model learning unit configured to learn the region-of-interest model based on the past region-of-interest learning encoding amount and the past region-of-interest, and
a non-region-of-interest-model learning unit configured to learn the non-region-of-interest model based on the past non-region-of-interest learning encoding amount and the past non-region-of-interest.

13. The image encoding device according to claim 10, wherein the region-of-interest learning-encoding-amount generating unit generates the past region-of-interest learning encoding amount by dividing the past region-of-interest encoding amount by the past region-of-interest area ratio, and the non-region-of-interest learning-encoding-amount generating unit generates the past non-region-of-interest learning encoding amount by dividing the past non-region-of-interest encoding amount by a value obtained by subtracting the past region-of-interest area ratio from 1.

14. The image encoding device according to claim 1, wherein the region-of-interest area-ratio calculator calculates the region-of-interest area ratio by calculating a percentage by which the block-of-interest occupies an entire image.

15. An image encoding method that is implementable by a computing device having
a processor, and
a non-transitory storage medium containing program instructions scored thereon, the image encoding method comprising:
determining, by the processor executing the program instructions, whether or not a block is a block-of-interest including a pixel-of-interest;
calculating, by the processor executing the program instructions, a region-of-interest area ratio based on a determination result obtained by the block-of-interest determining unit;
outputting, by the processor executing the program instructions, a region-of-interest model that expresses an encoding amount in a case where an entire image is encoded as a region-of-interest, and a non-region-of-interest model that expresses the encoding amount in a case where the entire image is encoded as a non-region-of-interest;
deciding, by the processor executing the program instructions, a region-of-interest quantization parameter and a non-region-of-interest quantization parameter based on a bit rate of compression data and the region-of-interest area ratio, the bit rate of compression data being calculated by multiplying the region-of-interest area ratio and the region-of-interest model, and multiplying the non-region-of-interest area ratio and the non-region-of-interest model; and compressing, by the processor executing the program instructions, an image input in accordance with a predetermined encoding method by using the block-of-interest, the region-of-interest quantization parameter, and the non-region-of-interest quantization parameter.

16. An image encoding device comprising:
a processor;
a non-transitory storage medium containing program instructions scored thereon, execution of which by the processor causes the image encoding device to provide functions of:
a block-of-interest determining unit configured to determine whether or not a block is a block-of-interest including a pixel-of-interest;
a region-of-interest area-ratio calculator configured to calculate a region-of-interest area ratio based on a determination result obtained by the block-of-interest determining unit;
a rate controller configured to decide a region-of-interest quantization parameter and a non-region-of-interest quantization parameter based on a bit rate of compression data, a limiting condition and the region-of-interest area ratio; and
a compressor configured to compress an image input in accordance with a predetermined encoding method by using the block-of-interest, the region-of-interest quantization parameter, and the non-region-of-interest quantization parameter,
wherein, assuming that an encoding amount of an entire image that satisfies the bit rate is defined as R, the region-of-interest quantization parameter is defined as Qr, the non-region-of-interest quantization parameter is defined as Qe, a region-of-interest model expressing an encoding amount in a case where the entire image is encoded as a region-of-interest is defined as Mr(Qr), a non-region-of-interest model expressing an encoding amount in a case where the entire image is encoded as a non-region-of-interest is defined as Me(Qe), and the region-of-interest area ratio is defined as a, the rate controller decides the region-of-interest quantization parameter and the non-region-of-interest quantization parameter that satisfy expression (A) and the limiting condition:

$$R = \alpha \times Mr(Qr) + (1-\alpha) \times Me(Qe) \tag{A}$$

* * * * *